(12) United States Patent
Urrutia

(10) Patent No.: US 6,579,028 B1
(45) Date of Patent: Jun. 17, 2003

(54) CONNECTING ROD FOR KNUCKLE JOINT DEVICE AND KNUCKLE JOINT DEVICE COMPRISING SAID ROD

(75) Inventor: Stephane Urrutia, Baurech (FR)

(73) Assignee: Dosatron International, Tresses (Bordeaux) (FR)

( * ) Notice: Subject to any disclaimer, the term of this patent is extended or adjusted under 35 U.S.C. 154(b) by 0 days.

(21) Appl. No.: 09/913,066

(22) PCT Filed: Jan. 27, 2000

(86) PCT No.: PCT/FR00/00177
§ 371 (c)(1),
(2), (4) Date: Aug. 9, 2001

(87) PCT Pub. No.: WO00/47907
PCT Pub. Date: Aug. 17, 2000

(30) Foreign Application Priority Data

Feb. 9, 1999 (FR) .............................................. 99 01483

(51) Int. Cl.$^7$ ................................................. B25G 3/18
(52) U.S. Cl. ...................... 403/321; 403/325; 403/327; 403/329; 403/DIG. 3; 74/2; 200/470
(58) Field of Search ............................ 403/53, 54, 171, 403/176, 179, 325, 321, 322.1, 327, 329, 330, DIG. 3; 74/38, 520, 585, 2, 4; 200/401, 315, 470, 471; 335/21, 123, 167, 172, 191

(56) References Cited

U.S. PATENT DOCUMENTS

| | | | |
|---|---|---|---|
| 4,141,437 A | | 2/1979 | Roberts |
| 4,574,519 A | * | 3/1986 | Eckebrecht |
| 4,595,895 A | * | 6/1986 | Fujii et al. .................... 335/167 |
| 4,622,529 A | * | 11/1986 | Batteux et al. ................ 335/21 |
| 4,740,770 A | * | 4/1988 | Lazareth et al. ............. 335/123 |
| 4,998,842 A | * | 3/1991 | Sheridan ...................... 403/171 |
| 5,230,229 A | | 7/1993 | Stadelmann et al. |
| 5,270,564 A | * | 12/1993 | Parks et al. |
| 5,335,522 A | | 8/1994 | Stadelmann et al. |
| 5,479,993 A | | 1/1996 | Bojar |
| 5,844,188 A | * | 12/1998 | Cella et al. ............. 335/172 X |
| 6,220,588 B1 | * | 4/2001 | Tunkers |

FOREIGN PATENT DOCUMENTS

| | | | |
|---|---|---|---|
| CH | 594864 A | * | 1/1978 |
| DE | 195 28 766 A1 | | 11/1996 |
| JP | 10309675 A | * | 11/1998 |

* cited by examiner

*Primary Examiner*—Gregory J. Binda
*Assistant Examiner*—Victor MacArthur
(74) *Attorney, Agent, or Firm*—Connolly Bove Lodge & Hutz LLP

(57) ABSTRACT

The connecting rod (1) for a knuckle joint device with three parallel axes comprises a substantially U-shaped center part (2), whereby the lower transversal branch (3a) thereof constitutes a third articulated axis (X3) of a release device and said branch (3a) is connected at a substantially right angle to the side branches (3b, 3c) and elastic deformation is possible, the side branches extend as far as the upper end thereof by means of segments (3d,3e) that are bent inwards and are parallel to the transversal branch, whereby said segments (3d,3e) display torsional elasticity around the geometric axis thereof such that a rotational return movement is possible on the side ranches (3b,3c) around said geometrical axis and the second axis (X2) of the knuckle joint device.

18 Claims, 2 Drawing Sheets

CONNECTING ROD FOR KNUCKLE JOINT DEVICE AND KNUCKLE JOINT DEVICE COMPRISING SAID ROD

The invention relates to a connecting rod for a toggle-joint device allowing a first component to be held stably in one of two positions relative to a second component.

A toggle-joint device such as this comprises a trigger articulated to the first component about a first axis, the aforementioned connecting rod being articulated, on the one hand, to the second component about a second axis parallel to the first axis and, on the other hand, to the trigger about a third axis parallel to the other two. When the trigger is in a stable position, the third axis lies outside the plane of the first two axes, and the switch from one stable position to the other requires the third axis to cross the plane of the first two axes, with deformation of the connecting rod. Thrusting means combined with elastic means are also provided to cause the trigger to change position abruptly.

The connecting rod in such a device, while being of a small size by comparison with the other components, constitutes a significant element on which the correct operation of the toggle-joint mechanism and its durability over time depend.

A toggle-joint device such as this may be used in diverse applications requiring two components to switch from one stable position to another stable position relative to one another abruptly. For example, the device may be used to control the change in positions of the valves in a differential hydraulic motor. Such a toggle-joint device may also be used for other applications, particularly in the field of circuit breakers or electric switches that require an abrupt change in position of two electric contacts, or in other locking mechanisms.

The object of the invention, is above all, to provide a connecting rod that makes it possible to simplify the production of a toggle-joint device and to ensure that it operates correctly.

According to the invention, the connecting rod has an essentially U-shaped central part, the transverse lower branch of which is designed to form the third axis of articulation of the trigger, this lower branch connecting more or less at right angles to lateral branches capable of elastic deformation, these lateral branches continuing at their upper end in the form of segments bent outward and parallel to the transverse branch, these segments having elasticity in torsion about their geometric axis so as to exert a rotational return force on the lateral branches about this geometric axis which is coincident with the second axis.

The connecting rod according to the invention thus elastically returns the trigger to a stable position.

As a preference, the lateral branches have an arched shape; advantageously, these lateral branches form bows lying in a plane orthogonal to the transverse branch.

The outwardly bent segments may be continued by other segments bent in the opposite direction to the bows; as a preference, these other segments are bent at right angles, are orthogonal to the transverse branch and are parallel to one another.

The ends of these segments may be set into the second component, and the freedom of the connecting rod to rotate about the second axis is provided by the torsional elasticity of the segments directed along the second axis.

Also as a preference, the connecting rod is made with longitudinal fibers of high mechanical strength capable of providing the lateral branches of the connecting rod with tensile and compressive elasticity, these longitudinal fibers being embedded in a plastic matrix capable of providing the segments that extend along the second axis with torsional elasticity.

The longitudinal fibers may be glass fibers or carbon fibers.

The invention also relates to a toggle-joint device comprising a connecting rod as defined previously.

Apart from the provisions set out hereinabove, the invention consists in a certain number of other dispositions which will be dealt with more fully after with regard to an exemplary embodiment described in detail with reference to the appended drawings but which is not in any way limiting.

FIG. 1 of these drawings is a view in perspective of a connecting rod according to the invention.

Figures 3, 4:
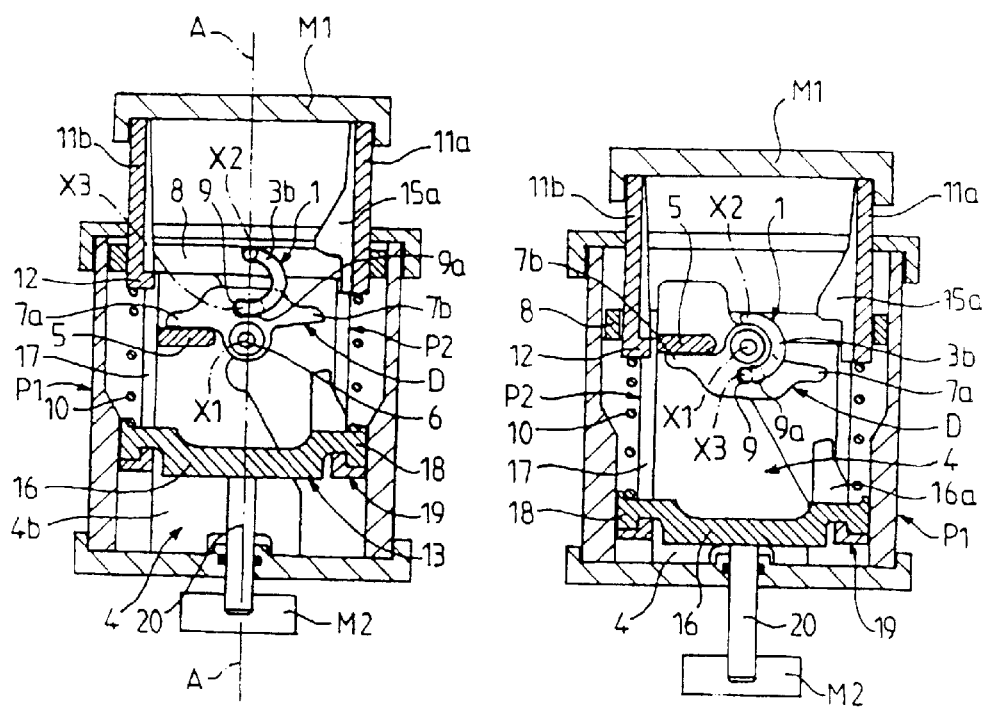
FIG. 3 is a schematic view in axial vertical section of a mechanism comprising a toggle-joint mechanism equipped with the connecting rod of FIG. 1, the mechanism being depicted in a first stable relative position of two components.
FIG. 4 shows, in a similar way to FIG. 3, the mechanism in the second stable position.
Figure 5:
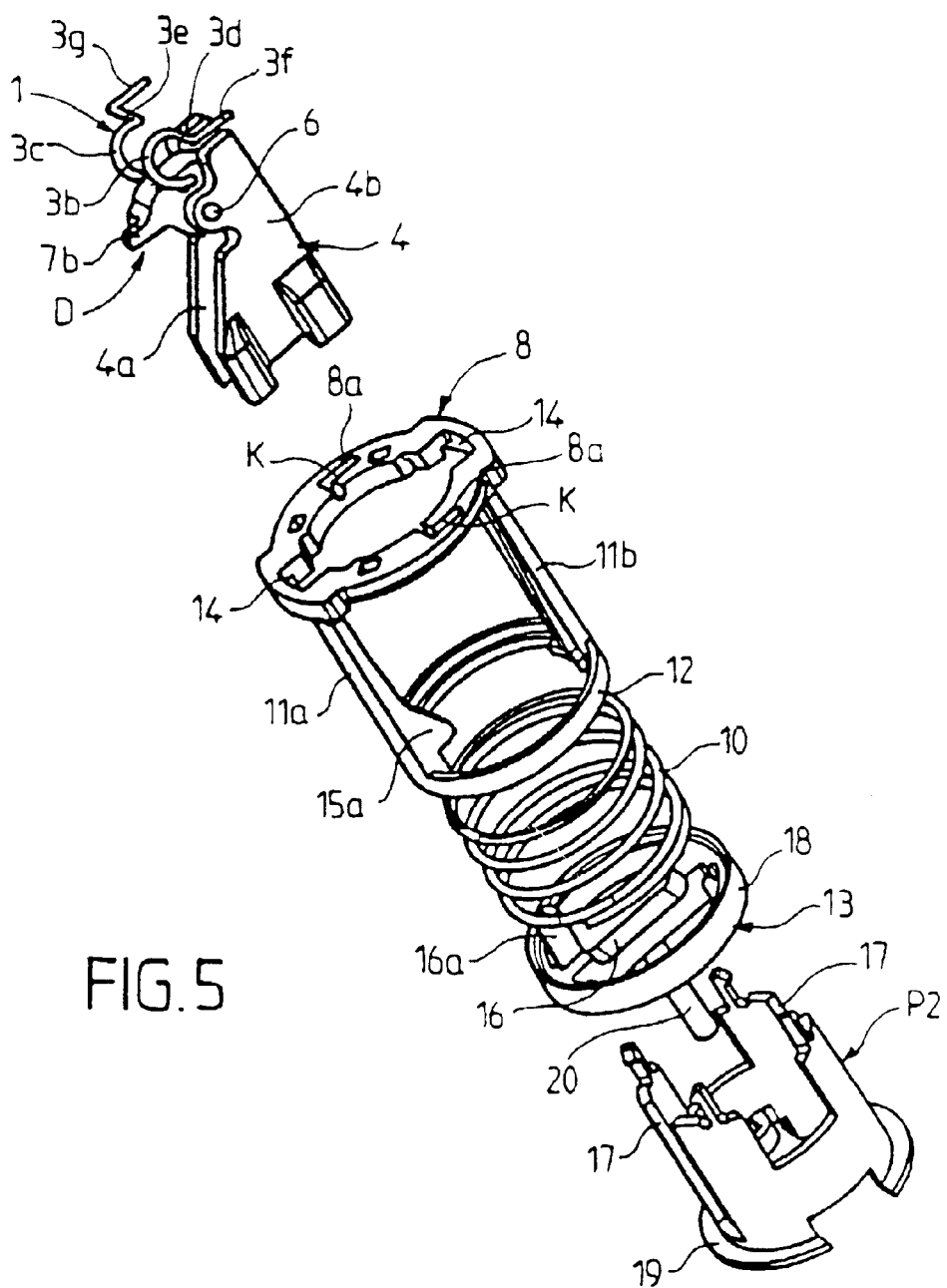

Finally, FIG. 5 is an exploded perspective of the elements located inside the mechanism of FIGS. 3 and 4.

Figures 1, 2:
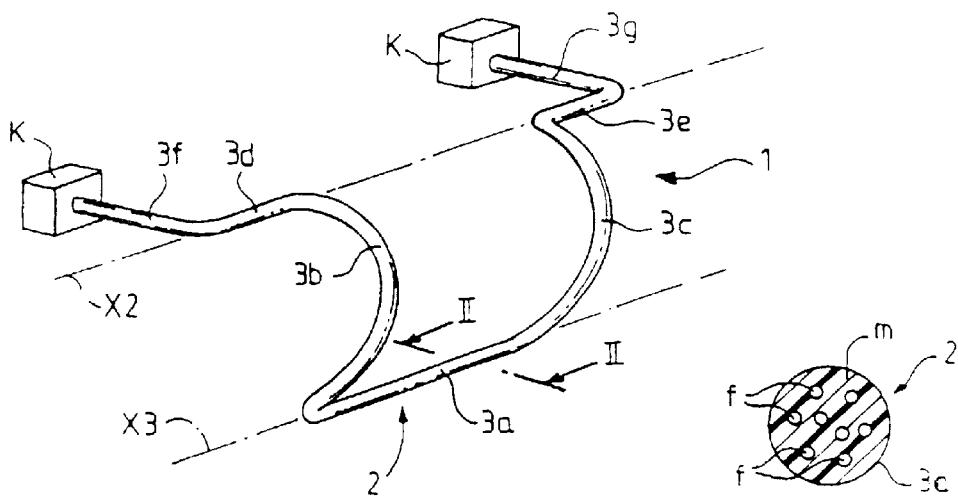
FIG. 2 is a section on a larger scale on II—II of FIG. 1.

FIG. 1 shows a connecting rod 1 made of a single piece. This connecting rod 1 comprises an essentially U-shaped central part 2 with a transverse lower branch 3a which is horizontal, according to the depiction of FIG. 1, designed to form an axis of articulation X3 of a trigger or trip D (FIGS. 3 to 5) of a toggle-joint device with three axes X1, X2 and X3.

The transverse branch 3a connects, at each end, to a lateral branch 3b, 3c essentially at right angles. Each lateral branch 3b, 3c preferably has the shape of an arc of a circle lying in a plane orthogonal to the transverse branch 3a. The bows of the branches 3b, 3c are parallel. They may undergo elastic deformation allowing the branch 3a to move parallel to itself, in a direction orthogonal to this transverse branch 3a. The lateral branches 3b, 3c can thus exert tensile and compressive elastic forces in a direction orthogonal to the branch 3a.

The bows 3b, 3c are continued, at their opposite end to the branch 3a, by horizontal segments 3d, 3e bent outward and parallel to the transverse branch 3a. The segments 3e, 3d have a certain elasticity in torsion about their geometric axis which constitutes the second axis X2 of the toggle-joint device. The transverse branch 3a and the lateral branches 3b, 3c can thus oscillate as a unit about the axis X2, being returned by the torsional moment developed by the segments 3d, 3e.

The segments 3d, 3e are continued by other segments 3f, 3g bent at right angles in the opposite direction to the bows, parallel to each other and orthogonal to the branch 3a. These segments 3f, 3g form tabs which may be fixed at their free end into an inset K depicted schematically.

The connecting rod 1 is advantageously made with longitudinal fibers f (FIG. 2) of high mechanical strength. The fibers f are parallel to one another. They run along the entire length of the connecting rod, describing the twisty shape of this connecting rod. The fibers f may, for example, be glass fibers or carbon fibers. These fibers f are embedded in a plastic matrix m that has good torsional elasticity.

It can thus be seen that at the segments 3d, 3e, the parallel fibers f exhibit practically no resistance in torsion. It is the matrix m which essentially comes into play for torsional deformations in that region.

By contrast, in the lateral branches 3b, 3c, the fibers f work in parallel in respect of the tensile and compressive forces exerted on the branches 3b, 3c.

An example of a toggle-joint device with trigger d is depicted in FIGS. 3 to 5.

FIG. 3 shows two components P1 and P2, P1 forming an outer housing and P2 consisting of a cylindrical liner or lantern ring mounted so that it can slide inside P1.

The toggle-joint device is designed to keep the component P2 in one of two stable positions relative to the component P1 and to cause it to switch abruptly from one stable position to the other.

The toggle-joint device comprises three parallel axes of rotation X1, X2 and X3 perpendicular to the plane of FIGS. 3 and 4.

A support 4 fixed to the component P1 is arranged inside the component P2. The support 4 may consist of two parallel panels 4a, 4b (FIG. 5) separated from one another and having a more or less right-trapezium shaped outline; a long vertical side is adjacent to the interior surface of the component P2 and the edge opposite this long vertical side is inclined. The two panels 4a, 4b are joined together, at their top part, by a horizontal transverse bar 5.

The trigger D is arranged between the panels 4a, 4b and is articulated to a shaft 6, the geometric axis of which constitutes the first axis of rotation X1. This shaft 6 is carried by two bearings provided in the panels 4a, 4b. The axis X1 lies in a diametral plane of the component P2 more or less at the height of the bar 5. The trigger D has two radial extensions 7a, 7b whose thickness (in the direction perpendicular to the plane of FIGS. 3 and 4) is less than that of the trigger and which are offset with respect to one another in the direction of the shaft 6.

The connecting rod 1 establishes an articulated connection between the trigger D and a plate 8 of the component P2. The tabs 3f, 3g of the connecting rod 1 are set into the plate 8. For example, the tabs 3f, 3g are fixed, for example by bonding, in grooves 8a constituting the inset K in the plate 8. The segments 3d, 3e of the connecting rod 1 are perpendicular to the plane of FIG. 1 and their geometric axis defines the axis X2 of rotation.

Passing through the trip D is a hole 9, the axis of which is parallel to the shaft 6 situated in the mid-plane of the trip. A hole 9a communicating with the hole 9 is provided to the side to make it easier to mount the connecting rod 1. The transverse branch 3a of the connecting rod 1 is engaged in the hole 9 and its geometric axis defines the axis X3 of articulation between the trip D and the connecting rod 1.

Two stable positions of the trigger D are determined by its coming into abutment respectively with the top face (FIG. 3) and the bottom face (FIG. 4) of the bar 5. The switch from one position to the other is by rotating the trigger D through about 180° relative to the support 4, about X1.

In the stable position of FIG. 3, the lines of the three axes X1, X2 and X3 are at the vertices of a flattened triangle, the axis X3 being slightly to the left of the plane passing through the axes X1 and X2. X3 is between X1 and X2.

To pass through the angular position corresponding to the three points X1, X2 and X3 being aligned, the trigger D has to cause slight elastic deformation of the connecting rod 1 at its branches 3b, 3c. What actually happens is that the components P1 and P2 in a stable position are generally in unilateral abutment (via means which have not been depicted) which, in the case of FIG. 3, prevents an increase in the distance between X1 and X2, and in the case of FIG. 4 prevents a decrease in the distance between X1 and X2.

In FIG. 4, X3 has crossed to the opposite side of X1 to X2. The lines of the three axes X1, X2 and X3 still form a flattened triangle, the axis X3 being slightly to the left with respect to the plane X2-X1.

It can be seen that the components P2 and P1 have changed relative position.

Control means are provided to ensure an abrupt change from the position of FIG. 3 to that of FIG. 4 and vice versa.

These control means comprise a spring 10 arranged around the component P2, exerting a force along the geometric axis A—A of the assembly.

Triggering means comprise two diametrically opposed upper push-rods 11a, 11b connected at their base by a circular ring 12, and a lower push-rod 13.

The upper push-rods 11a, 11b are guided in cutouts 14 of the plate 8, the ring 12 surrounding the component P2. The push-rod 11a has an inward radial projection 15a extending over enough distance to collaborate with the extension 7b of the trigger D. The spring 10 bears against the ring 12, which itself bears against the lower face of the plate 8.

The lower push-rod 13 has a diametral crossmember 16 passing through openings 17 in the wall of the component P2 and which guide the sliding of the push-rod 13. The crossmember 16 is secured to a ring 18 surrounding the lower part of the component P2 and bearing axially against a collar 19 of this component P2. Essentially semi-circular openings (FIG. 5) exist between the crossmember 16 and the interior contour of the ring 18, allowing the passage of the panels 4a, 4b.

The crossmember 16 is equipped with a rod 20 coaxial with the component P2 which passes through a central opening in the end wall of the component P1.

The crossmember 16 comprises, on one side, an upward projection 16a capable of collaborating with the extension 7a of the trigger in the position of FIG. 4.

This being the case, the way in which the toggle-joint device works is as follows.

It will be assumed that the component P1 is kept stationary, but the explanations which follow remain valid if this component P1 is given a motion which is transmitted to the component P2.

Starting out from the configuration depicted in FIG. 3, which corresponds to a first stable position, all that is required is for pressure to be exerted on the push-rods 11a, 11b, for example using a component M1 capping these two push-rods, to cause the push-rods 11a, 11b to move downward, compressing the spring 10 until the projection 15a begins to act on the extension 7b of the trigger.

The latter is then made to rotate in a clockwise direction about the axis X1.

Passage through the position in which the lines of the axes X2, X1 and X3 are aligned takes place at the expense of elastic deformation of the bows 3b, 3c and of a rotation of limited amplitude about the axis X2.

Once the aligned position has been passed, the spring 10 relaxes and causes the trigger D to turn abruptly, the extension 7b of which trigger comes to bear under the stop 5, the component P2 then occupying the second stable position illustrated in FIG. 4 relative to the component P1.

To return to the position illustrated in FIG. 3 all that is required is for the rod 20, for example equipped with a button M2, to be pressed in order to cause the trigger D to trip by action of the projection 16a against the extension 7a.

As already explained, the connecting rod 1 has a two-fold elastic function, firstly in tension and compression for locking the system, through action of the branches 3b, 3c, and secondly through the torsional elasticity of the segments 3e, 3d keeping the assembly in the locked position.

Such a toggle-joint device may be suited to any mechanism requiring a component P2 to pass from a first stable position to a second stable position relative to a component P1.

What is claimed is:

1. A toggle joint device disposed between a first component and a second component, wherein one of said first and second components is moveable with respect to the other, said toggle joint device comprising:
   a trigger connected to the first component at a location of a first axis, wherein said trigger is rotatable about said first axis;
   a thrusting means and an elastic element positioned to cause the trigger to change position abruptly;
   a connecting rod connected to the second component at a location of a second axis and connected to the trigger at a location of a third axis, wherein the first axis, second axis and third axis are parallel to one another, and wherein said connecting rod is articulated about said second axis and said third axis, said connecting rod comprising an essentially U-shaped central part including a transverse lower branch that forms the third axis, said lower branch connecting at substantially right angles to lateral branches forming bows lying in a plane orthogonal to the transverse branch, said bows continuing in the form of segments bent outward and parallel to the transverse branch, said segments having a geometric axis coincident with the second axis, and said segments having elasticity in torsion about the geometric axis so as to exert a rotational return force on the lateral branches about the geometric axis; and wherein:
      said toggle-joint device provides a first stable position of the first and second components and a second stable position of the first and second components;
      the first axis, second axis and third axis are disposed at vertices of a flattened triangle when the first and second components are positioned in either of the two stable positions;
      the toggle-joint device passes through an angular position corresponding to the first axis, second axis and third axis being positioned in the same plane in order to move the first and second components from one of the stable positions to another of the stable positions; and
      moving the first and second components from one of the stable positions to another of the stable positions causes elastic deformation of the connecting rod.

2. A toggle-joint device according to claim 1, wherein the segments extend to form other segments bent at right angles in an opposite direction to the bows, wherein the ends of the other segments are set fixed into the second component, and wherein freedom of the connecting rod to rotate about the second axis is provided by torsional elasticity of the segments directed along the second axis.

3. A toggle joint device according to claim 2, wherein the other segments are orthogonal to the transverse branch and are parallel to one another.

4. A toggle joint device according to claim 3, wherein the connecting rod is made with longitudinal fibers of high mechanical strength capable of providing the lateral branches of the connecting rod with tensile and compressive elasticity, wherein the longitudinal fibers are embedded in a plastic matrix capable of providing the segments that extend along the second axis with torsional elasticity.

5. A toggle joint device according to claim 4, wherein the longitudinal fibers comprise glass fibers or carbon fibers.

6. A toggle joint device according to claim 2, wherein the connecting rod is made with longitudinal fibers of high mechanical strength capable of providing the lateral branches of the connecting rod with tensile and compressive elasticity, wherein the longitudinal fibers are embedded in a plastic matrix capable of providing the segments that extend along the second axis with torsional elasticity.

7. A toggle joint device according to claim 6, wherein the longitudinal fibers comprise glass fibers or carbon fibers.

8. A toggle joint device according to claim 1, wherein the other segments are orthogonal to the transverse branch and are parallel to one another.

9. A toggle joint device according to claim 8, wherein the connecting rod is made with longitudinal fibers of high mechanical strength capable of providing the lateral branches of the connecting rod with tensile and compressive elasticity, wherein the longitudinal fibers are embedded in a plastic matrix capable of providing the segments that extend along the second axis with torsional elasticity.

10. A toggle joint device according to claim 6, wherein the longitudinal fibers comprise glass fibers or carbon fibers.

11. A toggle joint device according to claim 1, wherein the connecting rod is made with longitudinal fibers of high mechanical strength capable of providing the lateral branches of the connecting rod with tensile and compressive elasticity, wherein the longitudinal fibers are embedded in a plastic matrix capable of providing the segments that extend along the second axis with torsional elasticity.

12. A toggle joint device according to claim 11, wherein the longitudinal fibers comprise glass fibers or carbon fibers.

13. A connecting rod for a toggle-joint device, said toggle-joint device being disposed between first and second components, one of said first and second components being moveable with respect to the other, said toggle-joint device providing a first stable position of the first and second components and a second stable position of the first and second components, said toggle-joint device including a trigger that is connected to the first component at a location of a first axis and is rotatable about said first axis, said toggle-joint device including a thrusting means and an elastic element positioned to cause the trigger to change position abruptly, wherein:
   the connecting rod is connected to the second component at a location of a second axis and is connected to the trigger at a location of a third axis, wherein the first axis, second axis and third axis are parallel to one another.
   the connecting rod is articulated about said second axis and said third axis;
   the connecting rod comprises an essentially U-shaped central part including a transverse lower branch that forms the third axis, wherein said lower branch connects at substantially right angles to lateral branches forming bows lying in a plane orthogonal to the transverse branch, wherein said bows continue in the form of segments bent outward and parallel to the transverse branch, wherein said segments have a geometric axis coincident with the second axis, and wherein said segments have elasticity in torsion about the geometric axis so as to exert a rotational return force on the lateral branches about the geometric axis;
   the first axis, second axis and third axis are disposed at vertices of a flattened triangle when the first and second components are positioned in either of the two stable positions;
   the toggle-joint device passes through an angular position corresponding to the first axis, second axis and third axis being positioned in the same plane in order to move the first and second components from one of the stable positions to another of the stable positions;
   the connecting rod experiences elastic deformation when moving the first and second components from one of the first and second stable positions to another of the first and second stable positions; and the connecting rod is made with longitudinal fibers of high mechanical strength capable of providing the lateral branches of the connecting rod with tensile and compressive elasticity, wherein the longitudinal fibers are embedded in a plastic matrix capable of providing the segments that extend along the second axis with torsional elasticity.

14. The connecting rod of claim 13, wherein the segments extend to form other segments bent at right angles in an opposite direction to the bows, wherein the ends of the other segments are set fixed into the second component, and wherein freedom of the connecting rod to rotate about the second axis is provided by torsional elasticity of the segments directed along the second axis.

15. The connecting rod of claim 14, wherein the other segments are orthogonal to the transverse branch and are parallel to one another.

16. The connecting rod of claim 15, wherein the longitudinal fibers comprise glass fibers or carbon fibers.

17. The connecting rod of claim 14, wherein the longitudinal fibers comprise glass fibers or carbon fibers.

18. The connecting rod of claim 13, wherein the longitudinal fibers comprise glass fibers or carbon fibers.

* * * * *